Aug. 16, 1966  J. A. WAIDELICH, JR  3,266,369
COMPOUND THREE-ELEMENT LENS ASSEMBLY
Filed Sept. 4, 1962
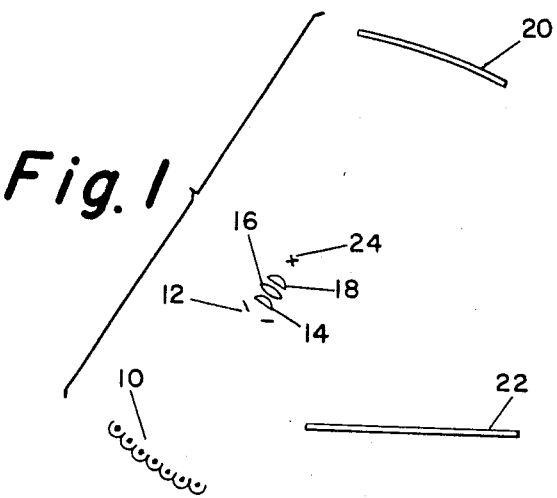
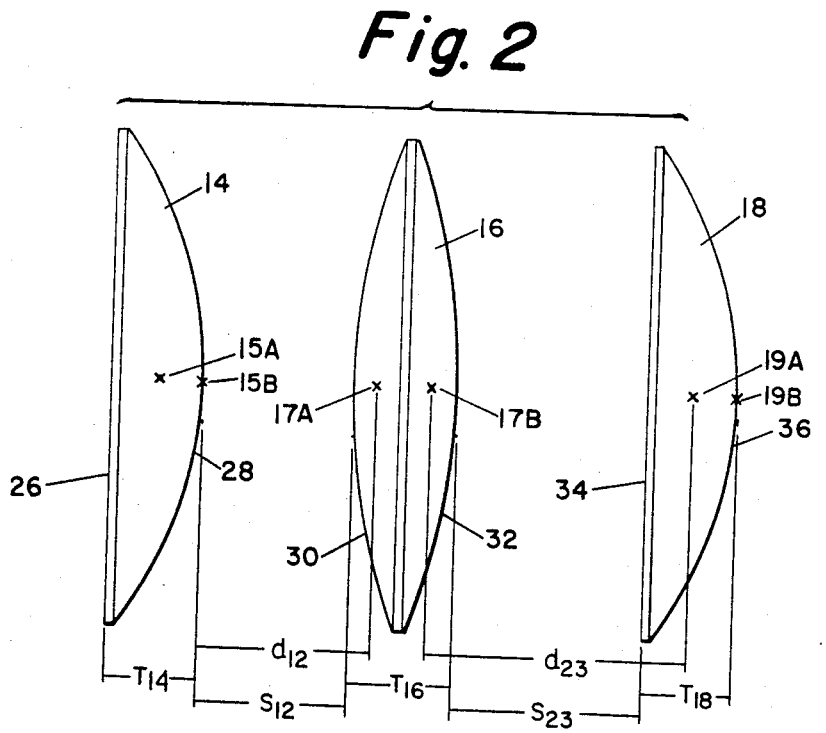
INVENTOR.
JOHN A. WAIDELICH, JR.
BY
Henry W. Kaufmann
AGENT

United States Patent Office 3,266,369
Patented August 16, 1966

3,266,369
COMPOUND THREE-ELEMENT LENS ASSEMBLY
John Albert Waidelich, Jr., Chalfont, Pa., assignor to General Electric Company, a corporation of New York
Filed Sept. 4, 1962, Ser. No. 221,027
1 Claim. (Cl. 88—57)

This invention pertains to the field of optics, and more particularly to a lens for use in means for producing an approximately collimated beam of radiation which may be of high energy density, over a wide spectral range, of large area, and of high uniformity over the cross section of the beam.

In the past, there have been many requirements for the simulation of some of the effects of solar radiation, as in the accelerated testing of paints, pigments, and dyes for color fastness under exposure to sunlight. These have conventionally been met by the use of devices such as carbon arcs which have been located close to samples of comparatively small area, reflectors of some kind being used to concentrate the radiation on the sample. Ordinarily such tests have not required even approximate collimation, nor a high degree of uniformity over a large plane area, since the samples tested have usually been relatively small. Furthermore, since the test conditions have commonly been arbitrarily established, consideration of such second-order effects as the increase in radiation upon a sample resulting from reflection of energy from the sample to a reflector behind the source, and subsequent reflection of such energy upon the sample, has ordinarily been neglected, as being a necessary result of the adoption of the arbitrary standard.

The necessity for simulating the effect of solar radiation upon space vehicles in order to determine on earth some of the parameters which will become of importance in space has created a much more stringent set of requirements for solar simulation. Such vehicles, in space, will be subjected to highly uniform radiation, from a source so distant that it will receive only negligible energy reflected back from the vehicle and also so distant that radiation from it is very nearly perfectly collimated, within an angle of the order of magnitude of a degree. The dimensions of such vehicles may be of the order of tens of feet, much larger than the usual size of test panels of the prior art described. The total power involved in the irradiation of a surface as large as the area of a space vehicle, at an intensity simulating that of the sun's radiation, is sufficiently great that it is highly desirable that any optical system employed to meet the preceding requirements be of high efficiency. However, the necessity for providing a system which can function satisfactorily with radiation over a very wide frequency band (of the order of three to five octaves) severely limits the refractive materials available to the designer; indeed, he is restricted, for practical purposes, to quartz and is thus denied the optical designer's chief reliance in solving problems of achromatism, the use of materials of similar refractive power and different dispersion.

A further problem which arises from the requirement for illuminating a large area at a high energy density, extending over a number of octaves in frequency, is that it is most convenient to obtain such radiation from gas-discharge lamps which are not available in such large sizes that it is feasible to employ only one, or even a few, such lamps. It therefore becomes necessary to provide some means to utilize the radiation from an array of a number of such lamps, and yet to achieve uniform density of illumination, rather than a number of brightly illuminated spots such as would be produced by simply forming a real image of such an array.

Also, since the testing of space vehicles must often be conducted in an evacuated chamber, it is desirable that the optical system be of such design that there is at least one point in the optical path between the light sources and the surface to be illuminated where the radiation passes through a relatively small cross-sectional area which may be located in the wall of the evacuated chamber, in order that the problems of hermetically sealing the chamber may not be rendered inordinately difficult; and, preferably, this point of small cross-sectional area should itself be a hermetic seal, such as may be produced by a transparent solid such as a lens element.

It has been taught by others to use as part of an illumination device for such purposes a portion of a paraboloidal reflector extending over the area to be illuminated, with its focus located to one side of this area, and to provide luminous energy at the focal point, whence it will be received by the reflector and reflected, substantially collimated, upon the working area, as if it came from a source at infinity. This is feasible; but the use of standard approaches to provide the required energy density and uniformity is sufficiently expensive to render desirable improved and more economical methods for doing so.

One such method employs an optical system for providing wide-band illumination of such a paraboloidal reflector, at high energy densities, in which the radiation is required to pass through a lens, the original direction of the radiation from an array of a plurality of sources being effected by reflectors, and having the further advantage that the lens system serves a dual function, in that it projects upon the paraboloid the overlapping real images of the light sources formed by the individual reflectors around the light sources; and it also condenses to the focus of the paraboloid the gross light source constituted by the entire array of sources. The performance by the lens of a double function causes the efficiency of the utilization of the radiation from the light sources to be increased, in a manner similar to the increase in illumination of the field of a microscope by the so-called reciprocal design, in which the lenses in the illumination system of the microscope act like field lenses for the imaging system, and the lenses in the imaging system act like field lenses for the illumination system.

The optical system described can, of course, employ a variety of lenses in its execution, but I have invented a novel compound lens or lens system which is particularly well adapted to use in an optical system such as I have described. First of all, its elements may all be formed of material having the same refractive index which, in the present instance, is preferably quartz, since this is a readily available stable and inexpensive material which is of reasonably high transparency over the very wide frequency band involved. Two of these elements are plano-convex and have their plane surfaces so located in the system that they may conveniently be coated with filtering and other absorbing materials so that the spectral characteristic of the radiation may be corrected as desired and the density of illumination may be adjusted as required. The two plano-convex lens elements, or simple lenses, may be identical, thus reducing the number of different elements required to assemble the lens system. Furthermore, a lens system according to my invention has a wide field relative to the diameter of the lens itself. This is desirable, as has been noted, in order to minimize the size of penetration of a chamber wall into which the radiation is to be introduced. Also, the lens system is so designed that its chromatic aberrations are reduced despite the fact that all of its elements have the same index of refraction and, in a particular case, would be of the same material and, therefore, have the same dispersion. The use of only three lens elements promotes high efficiency, since it is not feasible in a system which operates over a frequency range of approximately five octaves to reduce losses by surface reflections by the use of coating materials.

Thus I achieve a variety of desirable objects: I provide a system which is economical in the number of lens elements; which requires the use of only a single refracting material; which thus permits the convenient use of a plurality of light sources in such a way that their light output overlaps so that failure of one source will diminish the overall illumination rather than create a localized dark spot; which has high efficiency in the utilization of the radiation from the sources; which is adapted to transmit radiation extending in frequency over a number of octaves; which may readily be corrected as to spectral characteristic of radiation, and may equally readily be adjusted as to uniformity of radiation density. These advantages of my invention are all highly desirable, and are accompanied by certain other advantages, as will appear hereinafter.

For the better understanding and explanation of my invention, I have provided figures of drawing, as follows:

FIG. 1 represents schematically the general arrangement of an optical and illumination system employing my invention; and FIG. 2 represents a compound lens which is an embodiment of my invention.

FIG. 1 represents an array 10 of light sources which may comprise gas-discharge lamps having a filling of xenon or xenon and mercury, each such lamp being provided with reflectors which focus the radiation from the lamp to form a real image at mask 12. Details of a particular form of reflector especially suitable for use in such a system may be found in U.S. Patent 3,215,829. In general, however, any form of reflector which concentrates the light from the source to fill the aperture of mask 12 with a suitably continuous real image may be employed. In an actual such system, the light sources employed are xenon-filled lamps rated at 5 kilowatts input.

The mask 12 is located close to plano-convex lens 14 which, with double-convex lens 16 and plano-convex lens 18, form a compound lens which focuses the real image at mask 12 onto the surface of paraboloidal reflector 20, which reflects the radiation, substantially collimated, to the working surface 22. Mask 12 is shaped so that the projected real image of it is substantially coincident with the boundaries of reflector 20, the illumination from the real image formed within the aperture of mask 12 being thus confined to reflector 20.

While the array 10 is composed of light sources whose individual reflectors form real images of the light sources at the aperture of mask 12, as viewed from the vicinity of the mask the array will also appear as a distribution of light sources. A real image of these individual sources is formed by the lens system 12, 14, 16 at point 24, which is the focal point of the reflector 20. The light from these real images is reflected by reflector 20, substantially collimated, to the working surface 22. This latter action of the lens system utilizes light radiated directly from the light sources, not concentrated by the reflectors at each source, and thus enhances the overall efficiency of utilization of the light from the sources. The first action, in which the lens system projects on the reflector 20 the light from the image in the aperture of mask 12, is similar to that of a projection lens; the second, in which the lens system receives light from the comparatively distant sources, is similar to that of a condensing lens.

FIG. 2 represents in detail a specific embodiment of the lens system of my invention. All the lenses are preferably of fused quartz in order to transmit the wide frequency band of radiation involved. Plano-convex lenses 14 and 18 are identical, but are not symmetrically positioned, the convex side of 14 and the plane side of 18 being turned to face the central double-convex lens 16. The plane surface of lens 14 is located sufficiently close to the aperture of mask 12 (FIG. 1) so that absorbing material (such as evaporated metal) may be applied to its surface in density varying over the surface to correct deviations from the desired energy distribution over the face of the image formed in the aperture. Similarly, the plane face of lens 18 is sufficiently close to the real image of the entire array (formed at 24—FIG. 1) so that absorbing material may be applied to that plane face to adjust the distribution of energy over the surface of the real image formed at 18. Chromatically correcting filters may be applied to either or both plane surfaces, if required.

Dimensions of the lens system employed in an actual embodiment of this invention are as follows:

| | Inches |
|---|---|
| Radii of face 28 of lens 14 and of face 36 of lens 18 | 16 |
| Radii of faces 30 and 32 of lens 16 | 24 |
| Maximum thickness $T_{14}$ of lens 14 between faces 26 and 28 and $T_{18}$ of lens 18 between faces 34 and 36 | 2.5 |
| Maximum thickness $T_{16}$ of lens 16 between faces 30 and 32 | 4.0 |
| Spacing $S_{12}$ between apex of face 28 of lens 14 and apex of face 30 of lens 16 | 6.14 |
| Spacing $S_{23}$ between apex of face 32 of lens 16 and plane face 34 of lens 18 | 8.28 |
| Focal length of combination of lenses 14, 16, 18 | 16.28 |
| Back focal distance from face 26 of lens 14 | 2.67 |
| Back focal distance from apex of face 36 of lens 18 | 2.06 |
| Diameter of 14 and 18 | 16.5 |
| Diameter of 16 | 18.5 |

Focal lengths and distances are based on sodium D line, for which the refractive index is 1.4585.

Principal points of lens 14 are indicated as 15A and 15B; those of lens 16 are designated 17A and 17B; and those of lens 18 are designated 19A and 19B.

Since the lens system under consideration is made of material having the same index of refraction and, in the practical embodiment herein described, the same dispersion, it may be expected that it will show great chromatic aberration. For illumination purposes, a reasonable amount of aberration is tolerable; but excessively bad aberration is undesirable. It may be recalled that the formula for longitudinal chromatic correction is obtained by differentiating the combined power of a lens assembly with respect to the wavelength of light, and setting the derivative equal to zero. (See, for example, Concepts of Classical Optics, Strong, published 1958 by W. H. Freeman & Company, San Francisco, page 322.) Such an approach to the triplet lens leads to an enlightening result. If the powers (that is, the reciprocals of focal length) of the lenses 14, 16 and 18 are represented respectively by $F_1$, $F_2$ and $F_3$, and the distance between the principal points 15B and 17A of 14 and 16 and 17B and 19A of 16 and 18 are represented respectively by $d_{12}$ and $d_{23}$, an equation for a maximum or minimum power with respect to wave length is:

$$\begin{array}{rl} & F_1+F_2+F_3 \quad 0.094500 \\ + & 3F_1F_2F_3d_{12}\cdot d_{23} \quad 0.007883 \\ - & 2F_1F_2d_{12} \quad -0.016088 \\ - & 2F_2F_3d_{23} \quad -0.024303 \\ - & 2F_1F_3(d_{12}+d_{23}) \quad -0.031109 \\ \hline = & =0 \qquad\qquad 0.030883 \end{array}$$

The numerical values are based upon dimensions in inches, and are the values derived from substituting values corresponding to the embodiment of FIG. 2 in the terms at the left. The sum of all the positive terms is 0.102383, and of all the negative terms is −0.071500. It thus appears that, while complete chromatic correction has not been achieved, an approximation thereto has been produced, since the residual difference between positive and negative terms is of the order of only one-third of the sum of either. This, while obviously poor by the standards of narrow-band optics in which materials of different dispersions may be used, is helpful in the extremely difficult problem here involved.

It is evident from comparison of the back focal distances at either end of the lens assembly with the focal length of the combination that this design produces essentially the effect of elements 14 and 16 serving approximately as a doublet with 18 operating as a field lens, or alternatively it produces the effect of elements 16 and 18 serving approximately as a doublet with 14 operating as a field lens. This lens was, in fact, designed as a substitute for a conventional combination of two doublets. In the region of interest the economy of radiation achieved by eliminating one pair of lens faces is of great benefit; the economy achieved by reducing the number of actual simple lens elements is, of course, also desirable. Ray tracing by a computer indicates that the cone angle over which full illumination was obtained was approximately 45 degrees, compared with about 36 degrees for a pair of doublets—that is, a four element lens.

In summary, there has been described a novel lens design which is suited to function as both a projecting lens and a condensing lens, with high efficiency, over a wide spectral range. While a lens having such characteristics is required for the best functioning of a special illumination system described herein, such a lens is applicable to other purposes because of its novel design and resultant advantages. The many possible variations in optical designs render it impossible to recite the many possible applications of it, which will be apparent to those skilled in the art.

The appended claim is written in subparagraph form to render it easier to read. This particular manner of division into subparagraphs is not necessarily indicative of a particular relative importance or necessary subdivision of the physical embodiment of the invention.

Reference: Concepts of Classical Optics, John Strong, published by W. H. Freeman and Company, San Francisco, 1958.

What is claimed is:

A compound three-element lens assembly comprising, on a common axis,
- a first, plano-convex, lens of focal length P, its convex surface oriented toward
- a second, double convex, lens of focal length in the range from 0.7P to 0.8P;
- a third, plano-convex, lens of focal length in the range from 0.9P to 1.1P, the plane side whereof is oriented toward the said second lens;
- the spacing between the apex of the convex side of the said first lens and the next adjacent principal point of the said second lens being in the range between 0.20P and 0.24P;
- the spacing between the adjacent principal points of the said second lens and of the said third lens being in the range between 0.30P and 0.36P;
- all the said lenses being of material of the same refractive index for any frequency of radiation to which they are transparent and being transparent to radiation throughout a frequency range extending over at least three octaves.

References Cited by the Examiner

UNITED STATES PATENTS

| | | | |
|---|---|---|---|
| 1,784,171 | 12/1930 | Bertling | 240—1.1 |
| 1,955,850 | 4/1934 | Hallet et al. | 88—57 |
| 2,068,829 | 1/1937 | Van Abada. | |
| 2,456,711 | 12/1948 | Knutson et al. | 88—57 X |

JEWELL H. PEDERSEN, *Primary Examiner.*

FREDERICK M. STRADER, *Examiner.*

J. K. CORBIN, *Assistant Examiner.*